(12) United States Patent
Lerche et al.

(10) Patent No.: US 11,650,335 B2
(45) Date of Patent: May 16, 2023

(54) METHOD FOR THE POSITION AND ENERGY DETERMINATION IN SCINTILLATION DETECTORS

(71) Applicant: Forschungszentrum Juelich GmbH, Juelich (DE)

(72) Inventors: Christoph Lerche, Herzogenrath (DE); Wenwei Bi, Juelich (DE); Nadim Joni Shah, Juelich (DE)

(73) Assignee: FORSCHUNGSZENTRUM JUELICH GMBH, Juelich (DE)

( * ) Notice: Subject to any disclaimer, the term of this patent is extended or adjusted under 35 U.S.C. 154(b) by 0 days.

(21) Appl. No.: 17/768,481

(22) PCT Filed: Sep. 26, 2020

(86) PCT No.: PCT/DE2020/000222
§ 371 (c)(1),
(2) Date: Apr. 13, 2022

(87) PCT Pub. No.: WO2021/073668
PCT Pub. Date: Apr. 22, 2021

(65) Prior Publication Data
US 2022/0373699 A1    Nov. 24, 2022

(30) Foreign Application Priority Data
Oct. 15, 2019  (DE) .................... 10 2019 007 136.0

(51) Int. Cl.
*G01T 1/164*    (2006.01)

(52) U.S. Cl.
CPC ........................... *G01T 1/1644* (2013.01)

(58) Field of Classification Search
None
See application file for complete search history.

(56) References Cited

U.S. PATENT DOCUMENTS

| | | | |
|---|---|---|---|
| 9,903,960 B1* | 2/2018 | Berker | G01R 33/481 |
| 2016/0084974 A1 | 3/2016 | Lerche et al. | |
| 2016/0187497 A1* | 6/2016 | Lerche | G01T 1/1647 |
| | | | 250/362 |
| 2018/0059266 A1 | 3/2018 | Berker et al. | |
| 2019/0033471 A1* | 1/2019 | Lu | A61B 6/037 |
| 2019/0324161 A1* | 10/2019 | Ota | G01T 1/2985 |

OTHER PUBLICATIONS

Dewitt, Don et al; "Design of an FPGA-Based Algorithm for Real-Time Solutions of Statistics-Based Positioning"; IEEE Transactions on Nuclear Science; Feb. 10, 2010; pp. 71-77; vol. 57, No. 1; Institute of Electrical and Electronics Engineers (IEEE); New York, USA.

(Continued)

*Primary Examiner* — Hoon K Song
(74) *Attorney, Agent, or Firm* — Leydig, Voit & Mayer, Ltd.

(57) ABSTRACT

A method for determining position and energy in scintillation detectors includes determining a photoconversion energy and a photoconversion position of particles triggering scintillation events, in an iteration-free manner, calculated from a distribution of scintillation light released by one or more of the scintillation events. The distribution of scintillation light is scanned by a photodetector.

10 Claims, 3 Drawing Sheets

(56) References Cited

OTHER PUBLICATIONS

Goldschmidt, Benjamin et al; "Software-Based Real-Time Acquisition and Processing of PET Detector Raw Data"; IEEE Transactions on Biomedical Engineering; Jan. 16, 2016; pp. 316-327; vol. 63, No. 2; Institute of Electrical and Electronics Engineers (IEEE); New York, USA.

Gross-Weege, Nicolas et al; "Maximum likelihood positioning algorithm for high-resolution PET scanners; Medical Physics"; May 23, 2016; pp. 3049-3061; vol. 43, No. 6; American Association of Physicists in Medicine (AAPM); Alexandria, Virginia, USA.

Gutierrez, R. et al; "Low Cost Hardware Implementation of Logarithm Approximation"; IEEE Transactions on Very Large Scale Integration (VLSI) Systems; Oct. 28, 2011; pp. 2326-2330; vol. 19, No. 12; Institute of Electrical and Electronics Engineers (IEEE); New York, USA.

Johnson-Williams, Nathan G. et al; "Design of a Real Time FPGA-Based Three Dimensional Positioning Algorithm"; IEEE Transactions on Nuclear Science; Feb. 9, 2011; pp. 26-33; vol. 58, No. 1; Institute of Electrical and Electronics Engineers (IEEE); New York, USA.

Lerche, CH. W. et al; "Fast Circuit Topology for Spatial Signal Distribution Analysis"; 17th Real-Time Conference—IEEE-NPSS Technical Committee on Computer Applications in Nuclear and Plasma Science; Jan. 1, 2010; pp. 1-8; XP008155574; DOI: 10.1109/RTC.2010.5750391; Institute of Electrical and Electronics Engineers (IEEE); New York, USA.

Lerche, Christoph W. et al; "Maximum likelihood positioning and energy correction for scintillation detectors"; Physics in Medicine & Biology; Feb. 2, 2016; pp. 1650-1676; vol. 61; Institute of Physics and Engineering in Medicine; York, UK.

Liu, Chen-Yi et al; "Improved event positioning in a gamma ray detector using an iterative position-weighted centre-of-gravity algorithm"; Physics in Medicine & Biology; Jun. 25, 2013; pp. N189-N200; vol. 58, No. 14; Institute of Physics and Engineering in Medicine; York, UK.

Schug, David et al; "Data Processing for a High-Resolution Preclinical PET Detector Based on Philips DPC digital SiPMs"; IEEE Transactions on Nuclear Science; Jun. 12, 2015; pp. 669-678; vol. 62, No. 3; Institute of Electrical and Electronics Engineers (IEEE); New York, USA.

Schug, David et al; "Initial PET performance evaluation of a preclinical insert for PET/MRI with digital SiPM technology"; Physics in Medicine & Biology; Mar. 17, 2016; pp. 2851-2878; vol. 61; Institute of Physics and Engineering in Medicine; York, UK.

Wang, Rui et al; "Absolute Gamma Source Positioning with Position-sensitive Scintillation Detector Arrays"; 2018 IEEE Nuclear Science Symposium and Medical Imaging Conference Proceedings (NSS/MIC); Nov. 10, 2018; pp. 1-4; XP033612792; DOI: 10.1109/NSSMIC.2018.8824371; Institute of Electrical and Electronics Engineers (IEEE); New York, USA.

Wang, Yonggang et al; "An FPGA-Based Real-Time Maximum Likelihood 3D Position Estimation for a Continuous Crystal PET Detector"; IEEE Transactions on Nuclear Science; Feb. 16, 2016; pp. 37-43; vol. 63, No. 1; Institute of Electrical and Electronics Engineers (IEEE); New York, USA.

\* cited by examiner

METHOD FOR THE POSITION AND ENERGY DETERMINATION IN SCINTILLATION DETECTORS

CROSS REFERENCE TO RELATED APPLICATIONS

This application is a U.S. National Phase application under 35 U.S.C. § 371 of International Application No. PCT/DE2020/000222, filed on Sep. 26, 2020, and claims benefit to German Patent Application No. DE 10 2019 007 136.0, filed on Oct. 15, 2019. The International Application was published in German on Apr. 22, 2021 as WO 2021/073668 A1 under PCT Article 21(2).

FIELD

Embodiments of the present invention relate to a method for determining position and energy in scintillation detectors.

BACKGROUND

Scintillation detectors are elemental components of a wide variety of particle detectors that are used in particle and neutrino physics, in nuclear medical (e.g., positron emission tomography (PET), or Compton cameras and single-photon emission computed tomography (SPECT)), in radiological imaging and in radiation protection. Scintillation detectors are mainly used for the detection of particles that can trigger scintillation events, for example gamma photons, alpha particles or beta particles. They can be elementary particles, such as leptons or gamma or X-ray photons, or particles composed of elementary particles, such as mesons, baryons or ions. A scintillation detector usually includes a scintillator and a photodetector. Scintillators can be used in monocrystalline form (e.g., BGO, 1SO, etc.), polycrystalline form (e.g. ultra-fast ceramics), liquid form (e.g., xenon) or gaseous form (e.g. high-pressure xenon). Solid-state scintillators can be present as continuous crystals or as completely or partially segmented crystals. In the case of completely segmented scintillators, the individual scintillator segments are also called scintillator pixels. The individual scintillator segments are normally optically separated from one another partially or completely, for example by semi-permeable, impermeable or reflective layers. A scintillator that includes a plurality of scintillator segments is called a scintillator array or scintillator matrix. Photomultiplier tubes (PMTs), multi-channel plates (MCPs), avalanche photodiodes (APDs) and silicone photomultipliers (SiPMs) are used as photodetectors. The SiPMs can be designed either in analog technology (aSiPMs) or in digital technology (dSiPMs).

SUMMARY

Embodiments of the present invention provide a method for determining position and energy in scintillation detectors. The method includes determining a photoconversion energy and a photoconversion position of particles triggering scintillation events, in an iteration-free manner, calculated from a distribution of scintillation light released by one or more of the scientillation events. The distribution of scintillation light is scanned by a photodetector. The determination is made according to Equations (6), (7) and (8) set forth herein.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
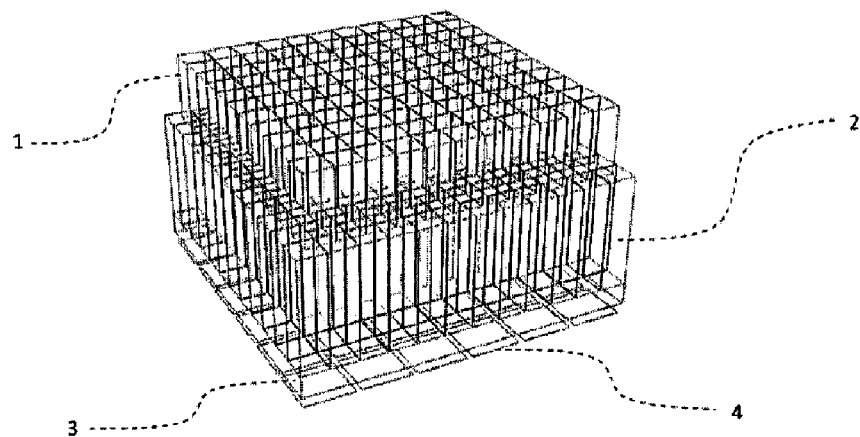
FIG. 1: A scintillation detector.

In many applications of scintillation detectors, it may be necessary that, in addition to determining the energy of the particle, the arrival time of the particle and ideally its three-dimensional position is also determined, but at least the two-dimensional position of photoconversion within the scintillator volume.

In the case of two-dimensional position determination, the photoconversion position is determined in a plane parallel to the photosensitive area of the photodetectors. These two coordinates are referred to hereinafter as the x coordinate and the y coordinate. The additional third coordinate in the case of three-dimensional photoconversion position determination is generally referred to as the depth of interaction and is referred hereinafter to as the z coordinate.

The measurement of the arrival time of the particle is usually carried out by the analysis electronics downstream of the photodetectors, e.g. by threshold discriminators or constant fraction discriminators or combinations of the two. In the case of dSiPMs, the arrival time of the individual photons can be measured directly in the photodetector without downstream analysis electronics and be made available directly for measurement data processing.

To determine the photoconversion position, position-sensitive photodetectors can be used. For this purpose, position-sensitive photomultiplier tubes (PSPMTs), micro-channel plates (MCPs), APD arrays and SiPM arrays are used. The latter includes matrices of normally independent, individual SiPMs or APDs, which are combined into a module by electronic integration. PSPMTs are usually realized by segmented anodes, a common photocathode and focusing dynodes, which is why the individual anode elements do not operate independently of one another. Both the anode segments of PSPMTs and MCPs and also the individual SiPMs and APDs of SiPM arrays and APD arrays are referred to as photodetector pixels.

An incoming gamma photon, also called a primary gamma photon, interacts with the scintillator via the photoelectric effect, pair production or the Compton effect. In the case of the photoelectric effect, the energy of the primary gamma photon is transferred completely to an electron of the scintillator, which then excites the scintillator material. In the Compton effect, only part of the energy of the primary gamma photon is transferred to an electron of the scintillator, which then excites the scintillator material. The gamma photon retains the remaining energy and can interact again with the scintillator via the photoelectric effect or the Compton effect. This process is repeated until an interaction via the photoelectric effect occurs, with which the gamma photon is destroyed or the gamma photon leaves the scintillator without further interaction. The latter event is called a Compton escape. An event with a plurality of interactions is called a Compton cascade. In the case of pair production, a positron and an electron are generated and the energy of the primary gamma photon is completely transferred to these two particles.

In contrast to the gamma photons, the range of the electrons, namely photoelectrons and Compton electrons, and of the positrons in the scintillator is very narrow (≤150 µm at electron energies of 511 keV). The energy delivered to the scintillator by the electron or positron excites the scintillation centers of the scintillator, which then decay while isotropically emitting scintillation light within a short period of time. Here, the number of scintillation photons is approximately proportional to the energy emitted by the particle, for example a gamma photon, during the interaction. In the case of complete Compton cascades—that is to say, the particle is completely converted in the scintillator into scintillation light and no Compton escape occurs—the total number of scintillation photons is therefore approximately proportional to the energy of the primary particle, for example of the gamma photon. The process by which energy is transferred from the gamma photon to the scintillator crystal via the photoelectron or Compton electron and is converted into scintillation photons is termed photoconversion.

An event in which the energy of precisely one primary gamma photon or particle is converted into scintillation light in one or more photoconversions is hereinafter to be termed a scintillation event.

The scintillation light delivered in the short period of time or a signal from the photodetector proportional thereto, e.g. voltage, current or charge, is integrated either directly by the photodetector and by downstream electronics over a defined, constant period of time. Integration is started by means of a trigger electronics unit, which compares the scintillation light intensity, which increases rapidly at the beginning of the scintillation pulse, against a threshold value (threshold discriminator) and starts the integration when the threshold value is exceeded. This threshold value is selected such that it is high enough compared to the thermal noise of the photodetector or other noise sources that a continuous triggering of integration due to the noise signals is avoided. In digital SiPMs, integration can be carried out directly in the SiPM and by counting the active micro-cells (also called single-avalanche photodiodes (SAPDs)) of the SiPM.

Due to the isotropic emission of the scintillation light, the scintillator would have to be completely enclosed by photodetectors for complete detection of the scintillation light. For economic reasons and on account of technical feasibility, usually only one side face of the scintillator is optically coupled to a photodetector. The remaining side faces are coated with a reflector, which reflects the scintillation photons, so that they reach the photodetector after one or more internal reflections. In the case of both continuous scintillators and segmented scintillators or scintillator arrays, a characteristic scintillation light distribution results in the plane of the optically coupled photodetector, position-sensitive photodetector or photodetector array due to the isotropic emission of the scintillation photons and internal reflections at the remaining scintillator surfaces. This scintillation light distribution has a maximum at the photoconversion position in the x-y plane, that is to say, the plane parallel to the sensitive area of the photodetector. Hereinafter this position will be designated $(x_{PK}, y_{PK})$. The greater the distance of the photodetector pixel from the $(x_{PK}, y_{PK})$ position in the x-y plane, the smaller the amount of scintillation light detectable by the photodetector pixel. At a sufficiently large distance from $(x_{PK}, y_{PK})$ the amount of scintillation light can even drop to zero.

The energy and the photoconversion position of the gamma photon can be determined from this scintillation light distribution. By inserting an optical waveguide, which in the simplest case includes a material layer transparent to the scintillation light, the scintillation light distribution can be varied easily and adapted to the photodetector pixel size for an optimal determination of the photoconversion position. The most widely used algorithm for determining the energy and the photoconversion position is determination of the expected value, also called the Anger method, after its inventor Hal Anger. For a photodetector array with $N_x$ photodetector pixels in the x direction and $N_y$ photodetector pixels in the y direction, according to this method the energy $(E)_{anger}$ the two coordinates $(X)_{Anger}$ and $(Y)_{Anger}$ of the photo conversion position can be determined thus:

$$\langle E \rangle_{Anger} = \sum_{i_x}^{N_x} \sum_{i_y}^{N_y} q_{i_x, i_y} \qquad (1)$$

$$\langle X \rangle_{Anger} = \frac{1}{\langle E \rangle_{Anger}} \sum_{i_x}^{N_x} \sum_{i_y}^{N_y} x_{i_x} \cdot q_{i_x, i_y} \qquad (2)$$

$$\langle Y \rangle_{Anger} = \frac{1}{\langle E \rangle_{Anger}} \sum_{i_x}^{N_x} \sum_{i_y}^{N_y} y_{i_y} \cdot q_{i_x, i_y} \qquad (3)$$

where $i_x=1, \ldots, N_X$ is the photodetector pixel index in the x direction; $i_y=1, \ldots, N_y$ is the photodetector pixel index in the y direction; $x_{i_x}$ is the center of gravity position of the $i_x$-th photodetector pixel index in the x direction; $y_{i_y}$ is the center of gravity position of the $i_y$-th photodetector pixel index in the y direction; and $q_{i_x, i_y}$ are the signals detected by the photodetector pixels $(i_x, i_y)$, which are proportional to the scintillator light quantity integrated over the total area of the photodetector pixels at the position $(x_{i_x}, y_{i_y})$ and in a defined period of time. Depending on the photodetector used and the electrical output circuit thereof, here $q_{i_x, i_y}$ can be analog or digital values, the numbers of active micro-cells or single avalanche photodiodes (SPAD), charges or voltages or currents. The method for energy and photoconversion position determination described by Formulas 1-3 can be improved according to (Chen-Yi & Goertzen, 2013 [1]) by the signals $q_{i_x, i_y}$ being replaced by weighted signals $w_{i_x, i_y} q_{i_x, i_y}$ where $w_{i_x, i_y}$ are to be determined individually.

However, determination of the energy and of the photoconversion position using Equations 1-3 or according to [1] does have two significant disadvantages. Firstly, it does not take into account that the detection of photons is a Poisson process, which is why the signals $q_{i_x, i_y}$ follow a Poisson statistic, and the statistical measurement error of $q_{i_x, i_y}$ is proportional to $\sqrt{q_{i_x, i_y}}$. In the case of small light quantities, this results in large statistical uncertainties for $(X)_{Anger}$ and $(Y)_{Anger}$. Secondly, photodetector arrays often include individual photodetector pixels that operate completely independently of one another. In particular, even the trigger electronics for the temporal integration of the signals of each individual photodetector pixel work independently of all other photodetector pixels in the photodetector array. The same can also apply to MCPs and PSPMTs. In interaction with the scintillation light distribution, the detectable light quantity for photodetector pixel positions, which are far away from $(x_{PK}, y_{PK})$, can assume a value that is close to the threshold value for the photodetector pixel ($i_x$, $i_y$). Due to the Poisson statistics of the signals $q_{i_x,i_y}$, this leads to the effect that integration of the signal for photodetector pixels ($i_x$, $i_y$) at a great distance from ($x_{PK}$, $y_{PK}$) is randomly triggered, depending on whether the signal subject to Poisson fluctuations lies above or below the threshold value. If integration of the signal proportional to the scintillation light is not started, the signal $q_{i_x,i_y}=0$ will result for this photodetector pixel. This means that the number of photodetector pixels with $g_{i_x,i_y}>0$ will differ from scintillation event to scintillation event and has the consequence that the positions (($X$)$_{Anger}$, ($Y$)$_{Anger}$) calculated according to Formulas 2 and 3 will have significant statistical errors (Lerche, et al., 2016 [2]). In (Schug, et al., 2015 [3]), this problem is circumvented by the signals $q_{i_x,i_y}$ of the photodetector pixels with no signal—that is to say, those in which integration has not been triggered because the integrated amount of scintillation light lies below the threshold value on account of the Poisson fluctuation—being replaced by a value obtained by linear extrapolation from the signals when $q_{i_x,i_y}>0$ for the same scintillation event. However, the extrapolated signal does not correspond to the actual quantity of scintillation light for the corresponding photodetector pixel, and the signal can be extrapolated for a maximum of one photodetector pixel when $q_{i_x,i_y}=0$.

A method, alternative to Equations 1-3, for the energy and position determination of scintillation events is the determination of the maximum likelihood (ML) estimated value as described in (DeWitt, et al., 2010 [4]), (Johnson-Williams, et al., 2010 [5]), (Wang, et al., 2016 [6]) and [2]. In [4], [5] and [6], iterative ML algorithms for determining the 2D or 3D position of the scintillation event in continuous scintillators are described, which are suitable for implementation in field-programmable gate arrays (FPGAs).

In the implementations according to [4] and [5], the Poisson distributions of the photodetector pixel signals are approximated by Gaussian distributions. In [2], an iterative ML implementation for determining the 2D position and the energy of the gamma photon or of another particle in segmented scintillators is described. For this last implementation, it has been shown that the problem described above, in which, due to Poisson fluctuations, photodetector pixels can occur when $q_{i_x,i_y}=0$, can be effectively solved, since ML-based algorithms allow the position and energy of the scintillation event to be determined exclusively by means of the photodetector pixels with $q_{i_x,i_y}>0$ signals, i.e. with incomplete data. Furthermore, when ML-based methods are used, it is possible to increase the threshold values of the individual photodetector pixels in a targeted manner. As a result, fewer photodetector pixel signals with values above the corresponding threshold values will be measured per scintillation event and therefore fewer integrations are triggered overall, which reduces the total dead time of the scintillation detector. If integration of the signal from a photodetector element has been triggered, no further integration can be triggered until the end of integration and of any possible further data processing steps. During this time, no further scintillation event can be detected. This time is called the dead time of the detector. In addition, fewer signals have to be transmitted because signal values $q_{i_x,i_y}=0$ are not being forwarded to the data acquisition unit, since they do not contain any information, which is the reason why the amount of data to be transmitted is reduced. An increase in the threshold value is not possible with the standard method according to Equations 1-3 without a reduction in the precession of the position and energy values.

A disadvantage of the Anger method is the problem already described above, in which, due to the Poisson fluctuations, photodetector pixels with $q_{i_x,i_y}=0$ can occur, which can lead to considerable false positioning [2]. In addition, the $q_{i_x,i_y}$ signals are fraught with further measurement errors, which are added to the Poisson fluctuations. The causes of these additional measurement errors are tolerances in the production of the PSPMTs, MCPs, SiPM arrays or APD arrays, which are manifested primarily by different intrinsic signal amplifications and thus by different signal strengths at actually the same amount of scintillation light. Further possible production tolerances occur in the positioning of the individual photodetector pixels, i.e. even the photodetector pixel positions ($x_{i_x}$, $y_{i_y}$), which enter into Equations 1-3 as weighting factors are fraught with errors due to production tolerances. Production tolerances also occur in the production of continuous scintillators and segmented scintillators, for example, small variations in the scintillator segment size and in the scintillator light quantity per particle energy unit (light yield), variations in the reflectivity of the scintillator surfaces, variations in the transparency of optical couplings, etc. Due to these and other sources of error, the energy and position of the scintillation event determined by Equations 1-3 is fraught with errors and requires a correction of the energy ($E$)$_{Anger}$ and of the position (($X$)$_{Anger}$, ($Y$)$_{Anger}$) following their determination. The correction values can be determined with the aid of a calibration measurement independently for each PSPT, MCP, each SiPM array, each APD array, each continuous scintillator and each segmented scintillator and be regularly repeated due to aging effects in the components.

When using ML-based methods for determining the energy and the position of the scintillation event, value tables (look-up tables, LUTs) with energy and position reference values may be needed. Calibration data can be integrated into these reference value tables by creating a separate reference value table for each scintillation detector. However, the reference value tables in all previous ML-based methods are so large that it is not possible to store reference value tables for all scintillation detectors of a full PET or SPECT scanner in fast-accessible memory (e.g., QDR RAM, UltraRAM, BRAM and flip-flops in FPGAs and the cache in CPUs and GPUs). The reference tables can therefore be stored in external SDRAM or DRAM modules, which however has a very disadvantageous effect on the total time for calculating the energy and position of the scintillation event due to the significantly lower read speed of these types of memory.

In addition, all ML-based methods known to date for determining the energy and the position of the scintillation event are iteratively formulated. This means that the algorithm can be run through several times before the final result is available. On the basis of a pre-defined abort condition, which in most cases evaluates whether a desired precession of the result has been reached, it is decided for each individual scintillation event whether further iterations are needed. As a result of such a definition, iteration numbers are obtained, which depend on the individual scintillation event, which adversely affects FPGA implementability and the total calculation time. Alternatively, an average optimum iteration number can be specified in advance. This improves FPGA implementation but does lead to many calculations with a sub-optimal number of iterations. All known ML-based methods [4], [5], [6] and [2] are based on an iterative formulation of the algorithm and are therefore too slow to process all the scintillation events of a typical PET or SPECT scanner in a reasonable time and with a reasonable hardware outlay. In the case of a state-of-the art human whole-body PET scanner, depending on the organ being investigated and the radiopharmaceutical used, between 2 and 4 million coincident scintillation events per second can occur, for which the energies and the positions have to be determined. In a dedicated organ-specific PET scanner, for example for the breast or head, this rate can even be twice as high. Due to the high data processing speed desired, Anger-based methods are therefore preferably used in human PET scanners.

In addition, in state-of-the-art PET scanners, coincident scintillation events are selected first. Scintillation events for which no coincident scintillation events are detected—so-called single events—are ignored. This significantly reduces the amount of data to be processed. However, this makes other necessary corrections, such as random coincidence correction and scatter correction, more difficult. These are to be determined more precisely and more easily when all coincidence events and single events are processed. In the case of a state-of-the-art human whole-body PET scanner, depending on the organ being investigated and the radio-pharmaceutical used, between 40 and 80 million single scintillation events per second can occur, for which the energies and the positions can be determined, in order to make single-based random coincidence correction and scatter correction possible.

The ML-based algorithm for continuous scintillators presented in [5] can process up to 117 000 scintillation events per second per FPGA. Consequently, a coincidence processing platform would require up to $4 \times 10^6/117\ 000 \approx 44$ FPGAs of the type mentioned in this study. A singles processing platform would require up to $80 \times 10^6/117\ 000 \approx 684$ FPGAs. With this implementation, it would therefore not be possible to build a cost-effective data processing platform.

The ML-based algorithm for continuous scintillators presented in [4] can process up to 360 000 scintillation events per second per FPGA. Consequently, a coincidence processing platform would require up to $4 \times 10^6/360\ 000 \approx 11$ FPGAs of the type mentioned in this study. A singles processing platform would require up to $80 \times 10^6/360\ 000 \approx 223$ FPGAs. With this implementation, it would therefore not be possible to build a cost-effective data processing platform.

The ML-based algorithm for continuous scintillators presented in [6] can process up to $15 \times 10^6$ scintillation events per second per FPGA. Consequently, a coincidence processing platform would require up to $4 \times 10^6/15 \times 10^6 \approx 1$ FPGAs of the type mentioned in this study. A singles processing platform would require up to $80 \times 10^6/15 \times 10^6 \approx 6$ FPGAs. With this implementation, it would thus be possible to build a cost-efficient data processing platform. However, in this implementation, the projections of the signals $q_{i_x,i_y}$ are first formed on the x and y axes according to Formulas 4 and 5:

$$Q_{i_x} = \Sigma_{i_y}^{N_y} q_{i_x,i_y} \quad (4)$$

$$Q_{i_y} = \Sigma_{i_x}^{N_x} q_{i_x,i_y} \quad (5)$$

In order for the energy and position of the scintillation events to be determined with sufficient precision from the $Q_{i_x}$ and $Q_{i_y}$ calculated in this way, $q_{i_x,i_y} > 0$ can again apply to all. For this reason, the individual threshold value of the photodetector pixels can be set so low that integrations are triggered for all photodetector pixels. As described above, this leads to a significantly longer detector dead time.

The ML-based algorithm for segmented scintillators presented in [2] can process up to 840 000 scintillation events per second in a multi-CPU System (CPU=central processing unit) with 40 threads. Consequently, a coincidence processing platform would require up to $4 \times 10^6/1\ 840\ 000 \approx 5$ data processing systems of the type mentioned in this study (see (Schug, et al., 2016 [7]) and (Goldschmidt, et al., 2015 [8]). A singles processing platform would require up to $80 \times 10^6/840\ 000 \approx 95$ data processing systems. An FPGA implementation of this variant has not been proposed and, as in the case of the other ML-based methods mentioned, proves to be very difficult due to the high demand for fast memory access. With this implementation, it would therefore not be possible to build a cost-effective data processing platform.

Embodiments of the present invention can overcome the disadvantages of the prior art. In particular, a precise and fast method for determining position and energy in scintillation detectors for medical and molecular imaging is to be made possible in order to make possible PET cameras, SPECT cameras or Compton cameras and scintigraphy cameras that have high spatial resolution, a short dead time and acceptable hardware performance requirements for the data processing unit. The method should be tolerant with regard to missing data and to the Poisson fluctuations in the signal typically occurring in scintillation detectors. Here, tolerant means that the positioning error due to the lack of data is so small that it does not lead to artifacts or to increased image noise in the image reconstructed from the data. The method should take into account that the detection of photons is a Poisson process, which is why the signals $q_{i_x,i_y}$ follow a Poisson statistic, and the statistical measurement error of $q_{i_x,i_y}$ is proportional to Implementation of the method in CPUs or FPGAs can be so resource-saving that, with only a few CPUs and/or FPGAs, all of the scintillation events detected in a PET, SPECT or scintigraphy examination can still be positioned in real time even during data acquisition. In the case of small light quantities, large statistical uncertainties for individual photodetector pixels should not affect precession of the position and energy values. An increase in the threshold value of the individual photodetectors should not result in a reduction in the precession of the position and energy values. Measurement errors and incorrect positionings of incoming particles are to be reduced. Production tolerances in the production of sensors should lead to smaller inaccuracies in the determination of the position and energy values. A subsequent correction of the energy and the position as in the Anger method (($E)_{Anger}$, and (($X)_{Anger}$, $(Y)_{Anger}$)) should no longer be necessary. Computing times for determining energy and position should be minimized and energy and position should be determined with an iteration-free method.

The method according to embodiments of the present invention overcomes the disadvantages of the prior art. In particular, an accurate and fast method for position and energy determination in scintillation detectors for medical and molecular imaging is provided in order to make PET cameras, SPECT cameras or Compton cameras and scintigraphy cameras available with high spatial resolution, a short dead time and acceptable hardware performance requirements for the data processing unit. The method is tolerant with regard to missing data and to the Poisson fluctuations in the signal typically occurring in scintillation detectors. The method takes account of the fact that the detection of photons is a Poisson process, which is why the signals $q_{i_x,i_y}$ follow a Poisson statistic, and the statistical measurement error of $q_{i_x,i_y}$ is proportional to $\sqrt{q_{i_x,i_y}}$. The method enables implementation in CPUs or FPGAs, which is so resource-saving that, with only a few CPUs and/or FPGAs, all of the scintillation events detected in a PET, SPECT or scintigraphy examination can still be positioned in real time even during data acquisition. In the case of small light quantities, large statistical uncertainties for individual photodetector pixels having an effect on the precession of position and energy values is prevented. Higher threshold values of the individual photodetector pixels can be realized without this leading to a reduction in the precession of the position and energy values. Measurement errors and incorrect positionings of incoming particles, which can trigger scintillation events are reduced. Particles that can trigger scintillation events are, for example, gamma or X-ray photons, alpha particles or beta particles. In principle, they can be elementary particles, such as leptons or gamma or X-ray photons, or particles composed of elementary particles, such as mesons, baryons or ions. These are referred to below as particles. Production tolerances in the production of sensors lead to smaller inaccuracies in the determination of position and energy values. An additional correction of the energy is not needed. Calculation times for the evaluation of the measurement results are minimized. The energy and the position are determined by an iteration-free method.

According to embodiments of the present invention, a method for determining position and energy in scintillation detectors is provided, with which an iteration-free algorithm for determining the energy and position of the scintillation event according to Equations (6), (7) and (8) is determined. According to embodiments of the present invention, a scintillation event can be triggered by particles that can trigger scintillation events, for example gamma photons, X-ray photons, alpha particles or beta particles. They can be elementary particles, such as leptons or photons, or particles composed of elementary particles, such as mesons, baryons or ions.

$$\mathcal{L}(m_j|\{q_{n_1}, \ldots, q_{n_t}\}) = \sum_{i=1}^{t} \widetilde{\log_2}(\mu_{m_j,n_i}) \cdot q_{n_i} - \max(q_{n_i}) \cdot \sum_{i=1}^{t} \mu_{m_j,n_i} \quad (6)$$

$$m_{ML} = \underset{m_j \in \{m_1, \ldots, m_p\}}{\operatorname{argmax}} \mathcal{L}(m_j|\{q_{n_1}, \ldots, q_{n_t}\}) \quad (7)$$

$$E_{ML} = \operatorname{norm}_{m_{ML}} \sum_{i=1}^{t} q_{n_i} / \sum_{i=1}^{t} \mu_{m_{ML},n_i} \quad (8)$$

In Equations (6)-(8):

$\mathcal{L}$: log-likelihood for the signals $\{q_{n_1}, \ldots, q_{n_t}\}$ and a scintillation event in the crystal with the subscript $m_j$;

$n_i \in \{n_i, \ldots, n_t\}$: subscripts of photodetector pixels to which $q_{n_i} > q_{th}$ and $t \leq N$ apply. $q_{th}$ denotes the threshold value set for the photodetector pixels, and t is the number of photodetector pixels with a signal above the threshold value $q_{th}$ $m_j \in \{m_1, \ldots, m_p\}$: subscripts of the scintillator segments, which are taken into account for the calculation.

$m_{ML}$: subscript of the scintillator segment, in which the scintillation most likely took place.

$q_{n_i}$: signals from the photodetector array for the photodetector pixels $n_i$.

$E_{ML}$: the most likely total energy of the scintillation event as determined by ML algorithm.

$\widetilde{\log_2}$: an approximation for the logarithm to the base 2

$\operatorname{norm}_{m_{ML}}$: a calibration factor for the correct calculation of energy for scintillator segment $m_{ML}$.

$\mu p_{mj,ni}$: probabilities of a scintillation photon emitted in scintillator segment $m_j$ being detected in the photodetector pixel.

$\mu_{m_{ML},n_i}$: Like $\mu_{m_j,n_i}$ but for $m_j = m_{ml}$;

The photoconversion energy and photoconversion position of particles that trigger scintillation events are calculated from the distribution, scanned by a photodetector, of the scintillation light released by a scintillation event or a plurality of scintillation events in an iteration-free method according to Formulas (6), (7) and (8).

The algorithm according to Equations (6) to (8) used according to embodiments of the present invention manages without iteration, which reduces the computing time and leads to high processing rates of the data. The Poisson statistic underlying the scintillation signals is taken into account and the position of the photodetector pixels in the xy plane can be selected as desired and does not need to lie on a Cartesian grid. The method is robust with respect to incomplete data, for which reason photodetector pixels without signal are not a problem and thus it is possible to achieve a sufficiently short scintillation detector dead time with, at the same time, a high precession of the determined energy and position values of the scintillation events.

In Equations (6)-(8), $m_{ML}$ denotes the subscript of the scintillator segment in which the scintillation most likely took place; $E_{ML}$ the most likely total energy of the scintillation event; $q_{n_i}$ the signals from the photodetector array; wherein signals with $q_{n_i} > q_{th}$ are only present for $\{n_1, \ldots, n_t\}$ photodetector pixels and $t \leq N$. In this case, t can be of different magnitude for each scintillation event, and the size of t can be influenced by the setting of the threshold value for the photodetector pixels. Small values of t between 5 and 20 are advantageous for a fast calculation according to Equations (6)-(8) given a photodetector pixel size of (3-5 mm)$^2$ and a scintillator segment size of (1-3 mm)$^2$. Since the order of the photodetectors pixel subscripts is irrelevant for the calculation using ML-based methods, the numbering of the photodetector pixels need not reflect their geometric arrangement. For the algorithm, the photodetector pixels can be arranged as desired in the plane of the photodetector array, and in particular, in the case of a Cartesian arrangement, $N_x = N_y$ need not apply. In Equations (6)-(8), $m_j \in \{m_1, \ldots, m_p\}$ denote the subscripts of the scintillator segments, which are taken into account for the calculation according to Equations (6)-(8). In the majority of cases, the scintillation event takes place completely in only one scintillator segment, also called a scintillator pixel. The further away this scintillator segment lies from the photodetector pixels, for which a signal $q_{n_i} > 0$ has been detected, the less likely it is that this scintillator segment is emitting the scintillation light. As a result, a ranking list for the scintillator segments on the basis of their distance d from the center of the scintillation light distribution in the x-y plane can be created and stored. The center of the scintillation light distribution is in this case determined by the position of the photodetector pixel with the maximum signal $q_{n_i}$. These ranking lists can even be determined in advance for each photodetector pixel and stored in a look-up table (LUT) with a size of $N \cdot M_{rel} \cdot [\log_2 M]$ bits. In this case, $M_{rel}$ denotes the number of relevant scintillator segments. This can be freely selected within the range $1 \leq M_{rel} \leq M$ Higher values of $M_{rel}$ will, however, lead to more precise results but longer processing times. In Equations (6)-(8), $\widetilde{\log_2}$ notes an approximation for the logarithm to base 2. The logarithm can be approximated, for example, as in (Gutierrez & Valls, 2010 [9]), wherein a very low accuracy with a mean relative error of 2%, a mean absolute error of 0.11 and its own maximum absolute error of 0.17 are sufficient. In Equations (6)-(8), $\operatorname{norm}_{m_{ML}}$ denotes a calibration factor for the correct calculation of the energy, and $\mu_{m_j,n_i}$ the probabilities that a scintillation photon, emitted in scintillator segment $m_j$, is detected in photodetector pixel $n_i$.

The probabilities $\mu_{m,n}$ are determined in advance by measurement, simulation or calculation and stored in a look-up table (LUT) with a size of M·N·P bits. P denotes the precession of the probability values, M denotes the total number of scintillator segments used in the scintillation detector and N the total number of photodetector pixels used in the scintillation detector. P depends on the detector type and should be greater than 8 bits. The calibration factors: $\text{norm}_m$ can be determined in advance by measurement, simulation or calculation and stored in a look-up table (LUT) with a size of M·P bits. Here, $\mu_{m,n}$ and $\text{norm}_m$ can be determined as follows from the measured light distributions $\hat{I}_{m,n}$ averaged over a plurality of scintillation events in accordance with Equations (9) and (10). Here, $\hat{I}_{m,n}$ is the mean light intensity for the photodetector pixel n when scintillation takes place in the scintillator segment m.

$$\mu_{m,n} = \hat{I}_{m,n} / \sum_{n=1}^{N} \hat{I}_{m,n} \qquad (9)$$

$$\text{norm}_m = \sum_{n=1}^{N} \hat{I}_{m,n} / \max(\hat{I}_{m,n}) \qquad (10)$$

In Equations (9) and (10):

$N=N_x \cdot N_y$: total number of photodetector pixels in the scintillation detector, where $N_x$ is the number of photodetector pixels in the x direction and $N_y$ the number of photodetector pixels in the y direction.

$\text{norm}_m$: calibration factors for the correct calculation of the energy.

$\hat{I}_{m,n}$: average light intensity for the photodetector pixel n, when scintillation takes place in the scintillator segment m.

The LUTs needed can be stored in external dynamic random access memory (DRAM), synchronous random access memory (SRAM), quad data rate (QDR), SRAM or memory modules with comparable performance.

For the complete determination of $E_{ML}$ and $m_{ML}$ based on a set of t signals $\{q_{n_1}, \ldots, q_{n_t}\}$ from a scintillation detector with M scintillator segments and a photodetector array with N photodetector pixels, wherein for the signals $\{q_{n_1}, \ldots, q_{n_t}\}$ the following applies: $q_{n_i} > 0 \ \forall i \in 1, \ldots, t \leq N$, the following calculation steps can be performed:

1. Identifying the photodetector pixel subscript $n_{max}$ with the maximum signal $q_{n_{max}}$. If there is a plurality of pixels with the maximum signal $q_{n_{max}}$, either only one can be selected or continue with both. Both $n_{max}$ and $q_{n_{max}}$ are cached in registers of the FPGAs or CPUs.

2. From the LUT, in which the scintillator segment subscripts are stored in descending order according to their distance d from the position of the photodetector pixel $n_{max}$, reading out the scintillator segment indices $\{m_1, \ldots, m_p\}$ most relevant to $1 \leq p \leq M$ and caching them in memory cells of the FPGAs or CPUs.

3. From the LUT, in which the detection probabilities are stored, reading out the $\{m_1, \ldots, m_p\} \times \{q_{n_1}, \ldots, q_{n_t}\}$ relevant probabilities $\mu_{m_j,n_i}$ where $i \in 1, \ldots, t$ and $j \in 1, \ldots, p$ and caching them in memory cells of the FPGAs or CPUs.

4. The approximated logarithms $\widetilde{\log_2}(m_j, n_i)$ are determined, summed with the $q_{n_i}$ and according to equation (6) and cached in memory cells of the FPGAs or CPUs.

5. The probabilities $\mu_{m_j,n_i}$ are summed in accordance with Equation (6) and the sum multiplied by $\max(q_{n_i})$ and cached in memory cells of the FPGAs or CPUs.

6. The scintillator segment subscript $m_{ML}$, for which the sum $\sum_{i=1}^{t} \widetilde{\log_2}(\mu_{m_j,n_i}) \cdot q_{n_i} - \max(q_{n_i}) \cdot \sum_{i=1}^{t} \mu_{m_j,n_i}$ the largest, is identified and cached in a memory cell of the FPGAs or CPUs.

7. The probabilities $\mu_{m_{ML},n_i}$ are summed according to Equation (8) and the result cached in a memory cell of the FPGAs or CPUs.

8. From the LUT, in which the calibration factors $\text{norm}_m$ for the correct calculation of the energy are stored, $\text{norm}_{m_{ML}}$ is read out and multiplied by the sum of the photodetector pixel signals $\sum_{i=1}^{t} q_{n_i}$ and divided by the sum of the probabilities $\mu_{m_{ML},n_i}$. In implementations in FPGAs, it makes sense to transfer the division operation out into the image reconstruction computer, since divisions in FPGAs require a lot of resources. The additional amount of data for transferring the dividends and divisor instead of only the quotient is negligible.

The calculation after steps 1-8 is not iterative. Divisions are not absolutely necessary and multiplications are minimized. According to embodiments of the present invention, the storage space with very fast access (e.g. cache in CPU, flip-flops, UltraRAM, BRAM, or comparable in FPGAs) is according to embodiments of the present invention minimized to the extent that all data can be accommodated in commercially available FPGAs and CPUs. Furthermore, the data transfer of data that cannot be accommodated in CPU cache or in FPGA flip-flops or in FPGA, BRAM or in FPGA UltraRAM is minimized. For the calculation of the logarithm, a very fast, approximated implementation can be selected, since high precession is not needed for the estimation of $E_{ML}$ and $m_{ML}$. The calculation according to steps 1-8 is significantly more robust and precise than the implementation of the Anger method (Equations (1)-(3)). The calculation according to steps 1-8 is significantly faster compared to all cited, alternative ML-based methods. In particular, with state-of-the-art high-end CPUs, steps 1-8 can be executed for 5 million scintillation events in one second, which is why only 16 threads are needed for the aforementioned $80 \times 10^6$ single scintillation events. In an FPGA implementation of calculation steps 1-8, processing the $80 \times 10^6$ single scintillation events is possible with just 4 high-end FPGAs.

Figure 3:
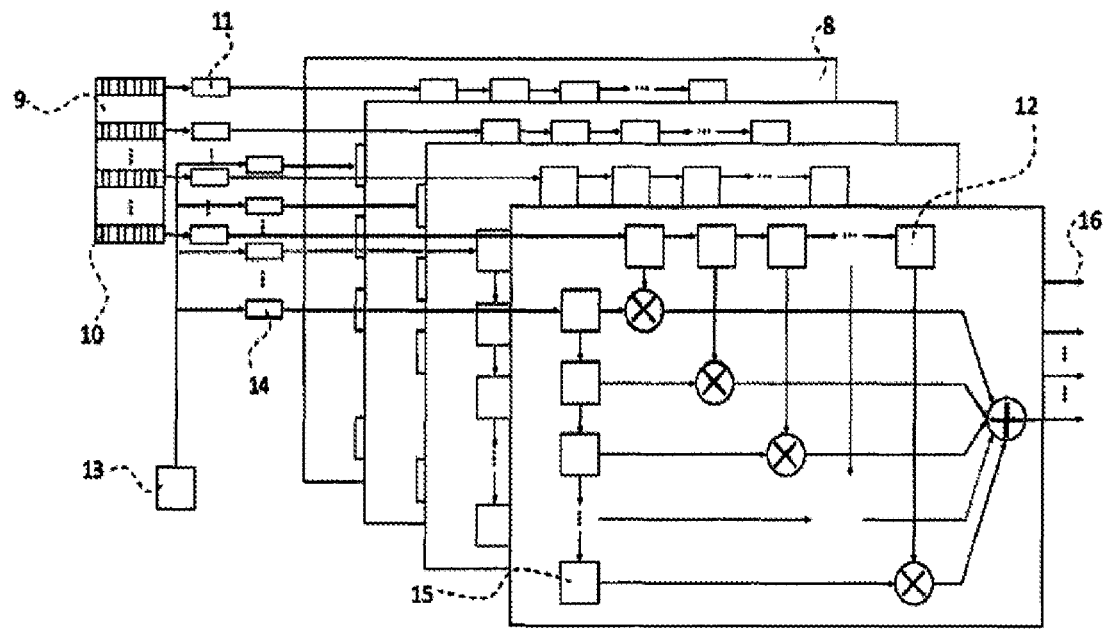
FIG. 3: A parallelized unit for calculating the approximated logarithms and for multiplication.

The formulation of the ML-based algorithm allows in particular an effective use of the parallelization possibilities in CPUs (duplication) and the parallelization possibilities in FPGAs (duplication and pipelining), as described in FIG. 3. A parallelization of the multiplications and of the calculation of $\widetilde{\log_2}(\mu_{m_j,n_j})$ of fundamental importance for a sufficiently fast and accurate calculation.

The ML-based algorithm described may also be used with continuous scintillators by dividing (quantizing) the three-dimensional continuous scintillator volume into a finite number of sub-volumes. Let the three-dimensional continuous scintillator volume be given by, for example, the dimensions H×B×T, then the height can be divided into $M_H$ intervals of length $H/M_H$, the width into $M_B$ intervals of length $B/M_B$ and the depth into $M_T$ intervals of length $T/M_T$. These three-dimensional intervals are then treated like individual scintillation segments. The calculation is identical to the calculation for scintillators that are actually segmented.

The figures show in schematic form detectors and units for determining the energy and position of particles in scintillation detectors:

FIG. 1 shows a typical structure of a scintillation detector with a plurality of layers of segmented scintillators (1), (2). 1 to 4 layers of segmented scintillators are possible. The lowest layer of the segmented scintillators (2) is coupled to the photodetector array (4) via a light guide (3), which in this simple case includes a plane-parallel material layer that is transparent for the scintillation light. The photodetector array can be a PSMPT, an MCP, an SiPM array or an APD array. Typical thicknesses of the light guide are 0.1 mm-2 cm, depending on the detector size and granularity of the scintillator and of the phototector array.

Figure 2:
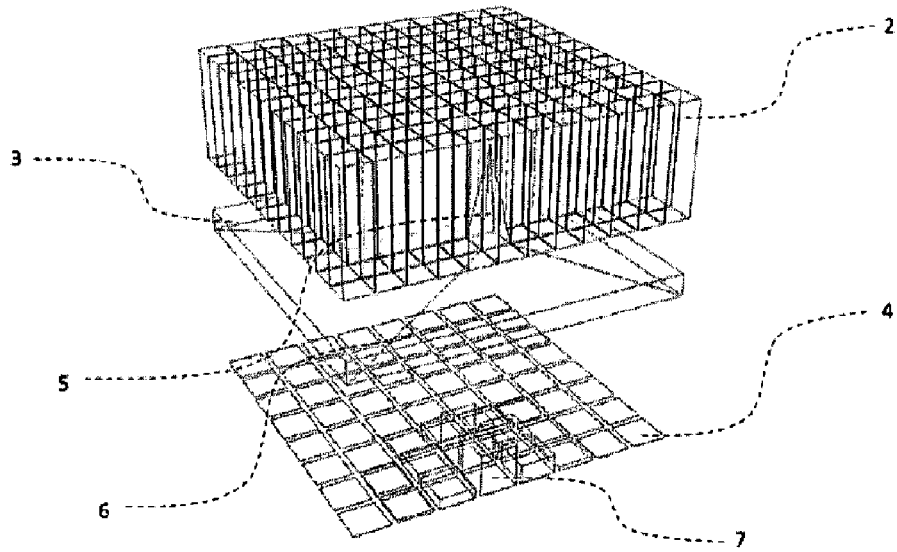
FIG. 2: An instance of signal generation in a scintillation detector.

In FIG. 2, the same device components have the same reference numerals as in the preceding figures. It depicts a single-layer segmented scintillator. The mode of operation of multi-layer scintillation detectors for three-dimensional photoconversion position determination for measurement of the depth of interaction with multi-layer segmented scintillators is analogous. The scintillation light (5) from a single scintillator segment is distributed (6) via the light guide (3) over the entire sensitive surface of the photodetector array (4). Depending on the threshold setting $q_{th}$ of the photodetector pixels of the photodetector array (4), an integration is then triggered and the signals $q_{i_x,i_y} > q_{th}$ (7) are supplied by the photodetector or downstream electronics. Signals where $q_{i_x,i_y} < q_{th}$ are not used to calculate the energy and position.

FIG. 3 shows a combined, parallelized multiplication unit including a plurality of individual multiplication units in pipeline mode (8). The detection probabilities $\mu_{m,n}$ are permanently stored in the memory unit (9), e.g., QDR, DRAM, SRAM, etc. In this illustration, the column address of a single detection probability $\mu_{m,n}$ gives the subscript n of the photodetector pixel and the row address gives the subscript m of the scintillation segment. Implementations with different assignments are also possible. The relevant detection probabilities $\mu_{m_j,n_i}$ are stored in caches (11) (e.g., UltraRAM, BRAM, flip-flops, cache, etc.) and input into a unit (12) for storing and calculating $\widetilde{log_2}(\mu_{m_j,n_i})$ the photodetector pixel signals are read in via a data interface (13), and p copies of the t signals $\{q_{n_1}, \ldots, q_{n_t}\}$ are stored in caches (14), wherein one memory unit (15) contains exactly one signal value. The values for $\Sigma_{i=1}^{t} \widetilde{log_2}(\mu_{m_j,n_i}) \cdot q_{n_i}$ n be read out at the outputs (16).

Figure 4:
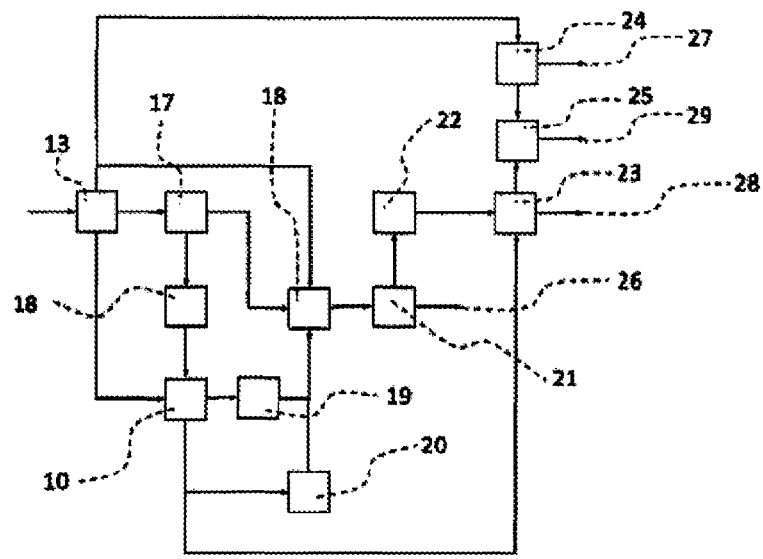
FIG. 4: Unit for determining the ML estimated value for the energy and position of the scintillation event.

In FIG. 4, the same device components have the same reference numerals as in the preceding figures. This shows a determination of the ML estimated value for the energy and position of the scintillation event. (13) denotes a data interface via which the t signals $\{q_{n_1}, \ldots, q_{n_t}\}$ are received. (17) is a unit for determining the photodetector pixel subscript with $n_i$ the maximum photodetector pixel value $q_{n_i}$ and for determining the maximum photodetector pixel value $q_{n_i}$. (20) denotes a memory unit, e.g. QDR, DRAM, SRAM, for permanent storage of the subscripts of the most p-relevant scintillator segment subscripts $\{m_1, \ldots, m_p\}$ for the photodetector pixel subscript. The reference sign (19) denotes an optional unit for determining the $\widetilde{log_2}(\mu_{m_j,n_i})$ lues if the $\widetilde{log_2}(\mu_{m_j,n_i})$ lues are not being determined in a combined, parallelized unit according to FIG. 3. (20): unit for determining the sums $\Sigma_{i=1}^{t} \mu_{m_j,n_i}$. (18) is a combined parallelized multiplication unit, as shown in FIG. 3 for calculating Equation (6). (21) is a unit for determining the scintillator segment subscript $m_{ML}$ with the greatest likelihood. Should a plurality of scintillator segments have the same likelihood, one of the scintillator segment subscripts with the greatest likelihood is selected. (22) denotes a memory unit, e.g. QDR, DRAM, SRAM, for permanently storing the calibration factors $norm_m$. (23) is a unit for calculating the sum of the probabilities $\mu_{m_{ML},n_i}$. (24) is a unit for calculating the sum of the photodetectors pixel values $q_{n_i}$. (25) represents a unit for calculating the quotient of the sum of the photodetectors pixel values $q_{n_i}$ and the sum of probabilities $\mu_{m_{ML},n_i}$. (26) is an output of the scintillator segment subscript $m_{ML}$ with the greatest likelihood. (29) is an output of the most probable energy $E_{ML}$. Alternatively, the sum of the probabilities $\mu_{m_{ML},n_i}$ can also be output via the output (28) and the sum of the photodetectors pixel values $q_{n_i}$ can be output via the output (27) and the division (25) can be transferred to a downstream CPU (in the case of a FPGA-based implementation).

Figure 5:
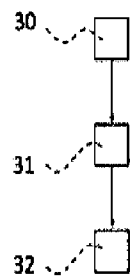
FIG. 5: Unit for determining the ML estimated value for energy and position when FPGAs and CPUs are used simultaneously.

FIG. 5 shows the implementation of determination of the ML estimated value for the energy and position of the scintillation event from the scintillation detector (30) with simultaneous use of an FPGA unit (31) and a CPU unit (32). The CPU unit (32) is necessary for further calculations, such as the coincidence search and image reconstruction.

Figure 6:
FIG. 6: Unit for determining the ML estimated value for energy and position when using CPUs.

FIG. 6 shows the implementation of the ML estimated value for the energy and position of the scintillation product from the scintillation detector (30) in the case of exclusive use of a CPU unit (32). The CPU unit (32) is needed for further calculations, such as coincidence search and image reconstruction.

Embodiments of the present invention can be used for example for the following examples:

1. A scintillation detector for PET or SPECT or scintigraphy or Compton cameras, including a single-layer, segmented scintillator, a light guide and a photodetector array (PSPT, MCP, APD array, SiPM array) and an electronics section with FPGA and memory, wherein the calculation steps 1-8 and the multiplication unit are implemented in the FPGA as in FIGS. 3 and 4.
2. A scintillation detector for PET or SPECT or scintigraphy or Compton cameras, including a multi-layer, segmented scintillator, a light guide and a photodetector array (PSPT, MCP, APD array, SiPM array) and an electronics section with FPGA and memory, wherein the calculation steps 1-8 and the multiplication unit are implemented in the FPGA as in FIGS. 3 and 4.
3. A scintillation detector for PET or SPECT or scintigraphy or Compton cameras, including a single-layer, continuous scintillator and a photodetector array (PSPT, MCP, APD array, SiPM array) and an electronics section with FPGA and memory, wherein the calculation steps 1-8 and the multiplication unit are implemented in the FPGA as in FIG. 3.
4. A scintillation detector for PET or SPECT or scintigraphy or Compton cameras, including a single-layer, continuous scintillator, a light guide and a photodetector array (PSPT, MCP, APD array, SiPM array) and an electronics section with FPGA and memory, wherein the calculation steps 1-8 and the multiplication unit are implemented in the FPGA as in FIGS. 3 and 4.
5. Implementations according to 1-4, wherein all calculation steps 1-8 are implemented in a CPU and not in an FPGA.
6. Implementations according to 1-5, wherein photodetector arrays are attached to more than one side of the scintillator. In the case of segmented scintillators, the upper and lower sides can be used in an orientation as in FIGS. 1 and 2 for reading out the scintillation light with photodetectors. In the case of continuous scintillators, all 6 sides can be used for reading out the scintillation light with photodetectors.

EXAMPLE

What is decisive for enabling sufficiently high processing rates for the single scintillation events and coincidence scintillation events occurring in a typical PET scanner is the use of an iteration-free algorithm, since this enables an efficient implementation in FPGAs and enables the use of the possibilities given thereby for parallelization (e.g. processing pipelines and duplication of the processing instances). The use of an ML-based algorithm is preferable, since this takes into account the Poisson statistic underlying the scintillation signals, and the positions of the photodetector pixels in the x-y plane can be selected as desired, and do not have to lie on a Cartesian grid as in the Anger method.

The use of an ML-based algorithm is also preferable, since ML-based algorithms are robust with respect to incomplete data, which is why photodetector pixels with no signal do not constitute a problem, and thus it is possible to achieve a sufficiently short scintillation detector dead time with at the same time a high precession of the determined energy and position values of the scintillation events. In order to achieve short dead times, it is also advantageous in the case of large scintillation detectors to use segmented scintillators, since then the scintillation light cannot propagate in the entire detector volume and the photodetector pixels with values $q_{i_x,i_y} > q_{th}$ are limited in their number and in the location in the x-z plane. As a result, in the case of individual operation of the photodetector pixels, a plurality of independent scintillation events can also be read out in a scintillation detector. This significantly reduces the dead time of the entire scintillation detector. For a scintillation detector including a photodetector array (PSPT, SiPM array, APD array) with $N = N_x \cdot N_l$ photodetector pixels and a single- or multi-layer segmented scintillator with $M = \Sigma_l M_l$ scintillator segments, and $M_l = M_{l,x} \cdot M_{l,y}$ scintillator segments in position l, an iteration-free ML-based algorithm for determining the energy and position of the scintillation event can be given as follows:

$$\tilde{L}(m_j | \{q_{n_1}, \ldots, q_{n_t}\}) = \sum_{i=1}^{t} \widetilde{\log_2}(\mu_{m_j, n_i}) \cdot q_{n_i} - \max(q_{n_i}) \cdot \sum_{i=1}^{t} \mu_{m_j, n_i} \quad (6)$$

$$m_{ML} = \operatorname*{argmax}_{m_j \in \{m_1, \ldots, m_p\}} \tilde{L}(m_j | \{q_{n_1}, \ldots, q_{n_t}\}) \quad (7)$$

$$E_{ML} = \operatorname{norm}_{m_{ML}} \sum_{i=1}^{t} q_{n_i} / \sum_{i=1}^{t} \mu_{m_{ML}, n_i} \quad (8)$$

Here, $M_{l,x}$ means the number of scintillator segments in the x direction at position l and $M_{l,y}$ means the number of scintillator segments in the y direction at position l. With single-layer scintillation detectors (only one layer of scintillator segments), the layer subscript l is omitted.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

CITED LITERATURE

[1] Chen-Yi, L. & Goertzen, A., 2013. Improved event positioning in a gamma ray detector using an iterative position-weighted centre-of-gravity algorithm. *Physics in Medicine & Biology*, 58(14), p. 189.

[2] Lerche, C. W. et al., 2016. Maximum likelihood positioning and energy correction for scintillation detectors. *Physics in Medicine & Biology*, 61(4), p. 1650.

[3] Schug, D. et al., 2015. Data processing for a high-resolution preclinical PET detector based on Philips DPC digital SiPMs. *IEEE Transactions on Nuclear Science*, 62(3), p. 669.

[4] DeWitt, D. et al., 2010. Design of an FPGA-based algorithm for real-time solutions of statistics-based positioning. *IEEE Transactions on Nuclear Science*, 57(1), pp. 71-77.

[5] Johnson-Williams, N. et al., 2010. Design of a real-time FPGA-based three-dimensional positioning algorithm. *IEEE Transactions on Nuclear Science*, 58(1), pp. 26-33.

[6] Wang, Y. et al., 2016. An FPGA-based real-time maximum likelihood 3D-position estimation for a continuous crystal PET detector. *IEEE Transactions on Nuclear Science*, 63(1), pp. 37-43.

[7] Schug, D. et al., 2016. Initial PET performance evaluation of a preclinical insert for PET/MRI with digital SiPM technology. *Physics in Medicine & Biology*, vol. 61, pp. 2851-2878.

[8] Goldschmidt, B. et al., 2015. Software-based real-time acquisition and processing of PET detector raw data. *IEEE Transactions on Biomedical Engineering*, 63(2), pp. 316-327.

[9] Gutierrez, R. & Valls, J., 2010. Low-cost hardware implementation of logarithmic approximation. *IEEE Transactions on Very Large Scale Integration (VLSI) Systems*, 19(12), pp. 2326-2330.

The invention claimed is:

1. A method for determining position and energy in scintillation detectors, the method comprising:
  determining photoconversion energy and photoconversion position of particles triggering scintillation events, in an iteration-free method according to Equations (6), (7) and (8), calculated from a distribution, scanned by a photodetector, of scintillation light released by one or more of the scintillation events, $$\tilde{L}(m_j | \{q_{n_1}, \ldots, q_{n_t}\}) = \sum_{i=1}^{t} \widetilde{\log_2}(\mu_{m_j, n_i}) \cdot q_{n_i} - \max(q_{n_i}) \cdot \sum_{i=1}^{t} \mu_{m_j, n_i} \quad (6)$$

$$m_{ML} = \operatorname*{argmax}_{m_j \in \{m_1, \ldots, m_p\}} \tilde{L}(m_j | \{q_{n_1}, \ldots, q_{n_t}\}) \quad (7)$$

$$E_{ML} = \operatorname{norm}_{m_{ML}} \sum_{i=1}^{t} q_{n_i} / \sum_{i=1}^{t} \mu_{m_{ML}, n_i} \quad (8)$$

wherein:
  $\tilde{L}$: log-likelihood for the signals $\{q_{n_1}, \ldots, q_{n_t}\}$ and a scintillation event in the crystal with the subscript $m_j$, $N=N_x \cdot N_y$: total number of photodetector pixels in the scintillation detector, wherein $N_x$ is the number of photodetector pixels in the x direction and $N_y$ is the number of photodetector pixels in the y direction, $n_i \in \{n_1, \ldots, n_t\}$: subscripts of photodetector pixels to which $q_{n_i} > q_{th}$ and $t \leq N$ apply, $q_{th}$ denotes the threshold value set for the photodetector pixels, and t is the number of photodetector pixels with a signal above the threshold value $q_{th}$, $n_{max}$: photodetector pixel subscript with the maximum signal $q_{n_{max}}$, $M = \Sigma_l M_l$: total number of scintillator segments in the scintillation detector, where $M_l = M_{l,x} \cdot M_{l,y}$ is the number of scintillator segments in the position l of a multi-layer scintillation detector; $M_{l,x}$ is the number of scintillator segments in the x direction in the position l and $M_{l,y}$ is the number of scintillator segments in the y direction in the position l, in the case of single-layer scintillation detectors (only one layer of scintillator segments), the layer index is omitted l, $M_{rel}$: number of relevant scintillator segments in the range $1 \leq M_{rel} \leq M$, which are freely selected, $m_j \in \{m_1, \ldots, m_p\}$: subscripts of the relevant scintillator segments, which for the calculation according to Equations (6), (7) and (8) are taken into account, where $1 \leq p \leq M_{rel}$ applies, $m_{ML}$: subscript of the scintillator segment in which the scintillation most likely took place, $q_{n_i}$: signals from the photodetector array for the photodetector pixels $n_i$, $E_{ML}$: the most likely total energy of the scintillation event after determination by the algorithm according to Equations (6), (7) and (8), $\widetilde{log_2}$ approximation for the logarithm to the base 2, $norm_m$: calibration factors for the correct calculation of the energy, $norm_{m_{ML}}$: calibration factor for the correct calculation of energy for scintillator segment $m_{ML}$, $\mu_{m_j,n_i}$: probabilities of a scintillation photon emitted in scintillator segment $m_j$ being detected in the photodetector pixel $n_i$, $\mu_{m_{ML},n_i}$: Like $\mu_{m_j,n_i}$ but for $m_j = m_{ML}$.

2. The method according to claim 1,
wherein
one or more photodetector pixel subscripts $n_{max}$ of the photodetector are identified with the maximum signal, and that from value tables in which the scintillation segment subscripts are stored in descending order according to their distance d from the position of a photodetector pixel $n_{max}$, the scintillator segment subscripts $\{m_1, \ldots, m_p\}$ most relevant to $1 \leq p \leq M_{rel}$ are read out and cached in memory cells of FPGAs or CPUs and used for calculating the log-likelihood according to Equation (6).

3. The method according to claim 2,
wherein
from the value table in which the detection probabilities $\mu_{m,n}$ are stored, the probabilities $\mu_{m_j,n_i}$ most relevant to $\{m_1, \ldots, m_p\} \times \{q_{n_1}, \ldots, q_{n_t}\}$ where $i \in 1, \ldots t$ and $j \in 1, \ldots, p$ are read out and cached in registers of FPGAs or CPUs and used for calculating the log-likelihood according to Equation (6).

4. The method according to claim 1,
wherein
the approximated logarithms $\widetilde{log_2} (\mu_{m_j,n_i})$ determined, cached in memory cells of FPGAs or CPUs, multiplied by $q_{n_i}$ and summed according to Equation (6).

5. The method according to claim 1,
wherein
the probabilities $\mu_{m_j,n_i}$ are summed according to Equation (6) and the sum multiplied by $\max(q_{n_i})$ and the results cached in memory cells of FPGAs or CPUs.

6. The method according to claim 1,
wherein
the scintillator segment subscript $m_{ML}$, for which the sum $$\sum_{i=1}^{t} \widetilde{log_2}(\mu_{m_j,n_i}) \cdot q_{n_i} - \max(q_{n_i}) \cdot \sum_{i=1}^{t} \mu_{m_j,n_i}$$

the largest is identified and the value is cached in memory cells of the FPGAs or CPUs.

7. The method according to claim 1,
wherein
the probabilities $\mu_{m_{ML},n_i}$ according to Equation (8) are summed and the result cached in a memory cell of the FPGAs or CPUs.

8. The method according to claim 1,
wherein
from a value table in which the calibration factors $norm_m$ for the correct calculation of the energy are saved, $norm_{m_{ML}}$ is read out and multiplied by the sum of the photodetector pixel signals $$\sum_{i=1}^{t} q_{n_i}$$

and divided by the sum of the probabilities $\mu_{m_{ML},n_i}$ according to Equation (8).

9. The method according to claim 8,
wherein
in the case of implementations in FPGAs, the division is stored externally in an image reconstruction computer.

10. The method according to claim 1,
wherein
the scintillation events are triggered by particles consisting of the group of gamma photons, alpha particles, beta particles, leptons, x-ray photons or particles composed of elementary particles, such as mesons, baryons or ions.

* * * * *